United States Patent
Cazzaniga et al.

(10) Patent No.: US 10,393,552 B1
(45) Date of Patent: Aug. 27, 2019

(54) SPOT MODE FUNCTIONALITY FOR POWER SAVING IN A SENSOR SYSTEM

(71) Applicant: Maxim Integrated Products, Inc., San Jose, CA (US)

(72) Inventors: Gabriele Cazzaniga, Rosate (IT); Luciano Prandi, Bellinzago Novarese (IT); Carlo Caminada, Pregnana Milanese (IT); Federico Forte, Novara (IT)

(73) Assignee: Maxim Integrated Products, Inc., San Jose, CA (US)

( * ) Notice: Subject to any disclaimer, the term of this patent is extended or adjusted under 35 U.S.C. 154(b) by 1038 days.

(21) Appl. No.: 14/019,499

(22) Filed: Sep. 5, 2013

Related U.S. Application Data

(60) Provisional application No. 61/749,659, filed on Jan. 7, 2013.

(51) Int. Cl.
  *G01D 7/00* (2006.01)
  *G01C 19/00* (2013.01)

(52) U.S. Cl.
  CPC ............... *G01D 7/00* (2013.01); *G01C 19/00* (2013.01)

(58) Field of Classification Search
  CPC . G01D 7/00; G01D 7/002; G01D 7/04; G01C 19/00; G01C 19/065; G01C 19/10; G01C 19/56; H03B 5/00; H03B 5/04; H03B 5/06
  See application file for complete search history.

(56) References Cited

PUBLICATIONS

Prandi et al., A Low-Power 3-Axis Digital-Output MEMS Gyroscope with Single Drive and Multiplexed Angular Rate Readout, 2011 IEEE International Solid-State Circuits Conference, Sensors & Energy Harvesting, Session 6, pp. 104-106.*
Prandi et al. Figures, 2011 IEEE, 3 pp.*

* cited by examiner

*Primary Examiner* — Toan M Le
(74) *Attorney, Agent, or Firm* — North Weber & Baugh LLP

(57) ABSTRACT

The invention relates to a sensor system, and more particularly, to systems, devices and methods of processing a sensing signal from a sensor to generate amplitude and phase controls for driving this sensor in a controlled manner and enabling synchronized operation of the sensor system. A signal processor in the sensor system comprises a sensor readout circuit, an amplitude controller and a phase controller. A subset of functional blocks in the signal processor may alternate between active and inactive power saving durations. During the active power saving durations, the subset of functional blocks are powered off or functionally disabled to conserve power consumption. The amplitude and phase controls are latched for the purposes of properly maintaining the driving signal and the system clock. During the subsequent inactive power saving durations, the subset of functional blocks return to normal operation to refresh the amplitude and phase controls.

20 Claims, 3 Drawing Sheets

SPOT MODE FUNCTIONALITY FOR POWER SAVING IN A SENSOR SYSTEM

CROSS REFERENCE TO RELATED APPLICATION

The application claims the benefit under 35 U.S.C. § 119(e) of Provisional Application Ser. No. 61/749,659, entitled "Spot Mode Functionality for Power Saving in a Sensor System," filed on Jan. 7, 2013, the subject matter of which is incorporated herein by reference in its entirety.

BACKGROUND

A. Technical Field

The present invention relates to an electromechanical sensor system, and more particularly, to systems, devices and methods of processing a sensing signal to provide amplitude and phase controls for generating a driving signal and/or a system clock in the sensor system.

B. Background of the Invention

A microelectromechanical structure (MEMS) is widely applied as a sensor to measure acceleration, rotation, pressure and many other physical parameters. The MEMS device is normally formed on a silicon substrate using a micromachining process, and thus, adopts characteristic feature sizes of several micrometers. Such miniaturized devices transduce mechanical movement to electrical signals that may indicate the level of the interested parameters. Examples of the MEMS device include accelerometers, gyroscopes, magnetometers, and pressure sensors. Various MEMS devices have been widely employed in applications ranging from common consumer products to specialized products used under extreme environments, and nowadays, they may be easily found in automotive parts, mobile phones, gaming devices, medical appliance, and military applications.

Many MEMS devices require both driving and sensing elements, and one exemplary device is a micromachined gyroscope. The driving element in the gyroscope is driven to oscillate at its resonant frequency, such that a Coriolis force is generated in response to a rotation rate. The Coriolis force is proportional to the oscillatory velocity of the driving element, and in this regard, the oscillatory velocity normally has to be controlled via a dedicated control loop. The Coriolis force further results in displacement, allowing the sensing element to detect the rotation rate. The aforementioned driving element is normally suspended above the silicon substrate, and anchored via elastic elements that are configured to offer desirable mechanical displacement or vibration. The sensing element may be electrodes that are coupled to the driving element to monitor the displacement induced by the Coriolis force along a certain sensing axis. In various prior arts, micromachined gyroscopes are configured to detect a rotation rate with respect to the x-axis, y-axis or z-axis, and some may even detect all three-dimensional rotation rates using one single integrated micromachined structure.

In the above MEMS devices, amplitude and phase of a driving signal have to be controlled with respect to a sensing signal. The amplitude of the sensing signal must be kept constant, and the phase of the sensing signal must be detected and known to the system. A control loop may be used to control the amplitude of oscillation at the resonant frequency of the gyroscope. Phases are also synchronous for both the driving signal and a system clock according to the phase of the sensing signal. Such amplitude and phase controls require a large amount of power in order to be implemented in a sensor signal processor that is coupled to a MEMS device like a gyroscope.

Power consumption may impose a significant challenge when the MEMS device is used in a wireless application, such as a mobile phone. Given that being wireless and mobile becomes a trend for future technologies, the disadvantage of large power consumption may considerably limit wide application of such MEMS devices. As a result, a need exists to reduce the power consumption of the signal processor that is integrated with MEMS devices requiring both driving and sensing.

SUMMARY OF THE INVENTION

Various embodiments of the present invention relate to a sensor system, and more particularly, to systems, devices and methods of processing a sensing signal to provide amplitude and phase controls for generating a driving signal and/or a system clock in the sensor system. In a signal processor of the sensor system, a spot mode is applied to conserve power consumed by the signal processor.

In accordance with the invention, a sensor signal processor that operates at a spot mode to conserve power consumption comprises a sensor readout circuit, an amplitude controller and a phase controller. The sensor readout circuit generates a sensor output based on a sensing signal received from a sensor. The amplitude controller generates an amplitude control that controls a drive generator to drive a driving element in the sensor to oscillate with a controlled amplitude according to the sensing signal. The phase controller generates a phase control that is used to control the drive generator and the sensor readout circuit to operate in a synchronized manner. At the spot mode, a subset of functional blocks in the sensor signal processor are powered off during a plurality of active power saving durations and powered on during a respective inactive power saving duration subsequent to each of the plurality of active power saving durations, and the amplitude and phase controls are latched and refreshed during the plurality of active and inactive power saving durations, respectively.

In accordance with the invention, a method of conserving power is applied in a sensor system. A start and a length of an active power saving duration are determined at a spot mode, and a subset of functional blocks in the sensor system are selected during the active power saving duration. An amplitude control and a phase control are latched to for controlling generation of a driving signal that drives a sensor to oscillate with a controlled amplitude and for controlling the sensor system to operate in a synchronized manner, respectively. The subset of functional blocks are powered off for the length of the active power saving duration. During a subsequent inactive power saving duration, the subset of functional blocks is powered on to refresh the amplitude and phase controls.

In accordance with some embodiments, the subset of functional blocks are functionally disabled and enabled during an active power saving duration and a subsequent inactive power saving duration, respectively.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Figure 1:
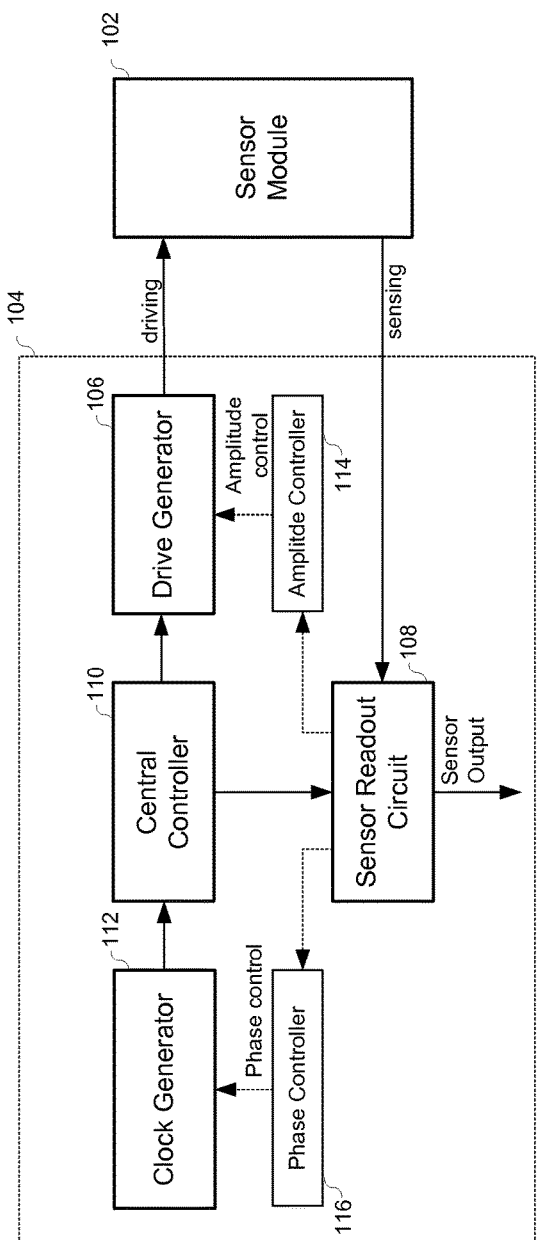
FIG. 1 illustrates an exemplary block diagram of a sensor system according to various embodiments in the invention.

FIG. 1 illustrates an exemplary block diagram 100 of a sensor system according to various embodiments in the invention. The sensor system 100 comprises a sensor module 102 and a signal processor 104 that includes a drive generator 106 and a sensor readout circuit 108. The sensor module 102 is driven by a driving signal provided by the drive generator 106 and outputs a sensing signal to the sensor readout circuit 108. A central controller 110 is further included in the signal processor 104 to control the drive generator 106 and the sensor readout circuit 108 in a synchronized manner, and a clock generator 112 provides a system clock to the central controller 110 for the purposes of synchronization. In various embodiments of the invention, a subset of functional blocks may be powered off or disabled to partially conserve power consumption of the signal processor 104, but not impact normal operation of the sensor system 100.

In certain embodiments, the sensor module 102 is a micromachined gyroscope that includes a driving element driven to oscillate along a first axis at a resonant frequency $f_R$. In response to rotation with respect to a second axis, a Coriolis force is generated to cause a vibratory displacement along a third axis. The driving element is electrostatically driven by the driving signal, and the sensing signal is coupled from the vibratory displacement. The first, second and third axes are orthogonal to each other. A properly-arranged gyroscope may detect rotation within respect to an axis in parallel with or perpendicular to the plane of the driving element. In certain embodiments, a three-dimensional (3D) gyroscope may even be configured to detect rotation with respect to any axis among the three orthogonal axes.

The amplitude of the driving signal needs to be controlled within a certain range. Excessive driving may induce an excessive oscillation for the driving element, causing permanent damages to the mechanical structure of the sensor module 102. Moreover, an excessive response may be induced beyond the dynamic range of the sensor readout circuit 108. Therefore, the amplitude of the driving signal has to be controlled with respect to the sensing signal, such that mechanical reliability is maintained and the sensing signal is generated within the targeted dynamic range.

In some embodiments, the sensor module is a gyroscope in which the Coriolis force induced by an angular rate is proportional to oscillatory velocity of the driving element. The amplitude of such oscillatory velocity is preferably maintained at a constant value. Since the oscillation movement generated by the electrostatic driving force is associated with the driving signal, the driving signal has to be controlled in terms of its magnitude and phase as well in the gyroscope.

The frequency of the system clock is associated with the resonant frequency $f_R$ of a resonating mass movement within the sensor module 102, and in a gyroscope-based embodiment, the resonating mass movement is the oscillatory driving movement of the driving element. The phase of the system clock needs to be locked in phase with such resonating mass movement such that an efficient driving signal may be generated by the signal processor 104 based on the system clock.

For the purposes of generating the amplitude and phase controls, the signal processor 104 further comprises an amplitude controller 114 and a phase controller 116. The amplitude controller 114 is coupled between the sensor readout circuit 108 and the drive generator 106, and feeds an amplitude control signal to control the amplitude of the driving signal according to the sensing signal. The phase controller 116 is coupled between the sensor readout circuit 108 and the clock generator 112, and generates a phase control signal to lock the clock system in phase with the sensing signal.

Consequently, a first drive loop is formed among the sensor module 102, the drive generator 106, the sensor readout circuit 108 and the amplitude controller 114. This first drive loop is used to control the amplitude of the driving signal. In a broad sense, a second drive loop is formed to control the phase of the system clock based on the sensor module 102, the sensor readout circuit 108, the phase controller 116, the clock generator 112, the central controller 110 and the drive generator 106.

The sensor system 100 may operate at a spot mode in which a subset of functional blocks are controlled to function in a time-multiplexed manner to conserve power consumption of the signal processor 104. To be specific, the subset of functional blocks alternate between active and inactive power saving durations. The subset of blocks are powered off or disabled during the active power saving durations. During the inactive power saving durations, the subset of functional blocks are powered and enabled properly. This capability is particularly important, when the sensor system 100 is used for certain applications that are sensitive to power consumption. One exemplary application is a mobile device that operates on battery power.

In some embodiments, the subset of functional blocks are completely powered off, and do not consume any static or dynamic power. In certain embodiments, the subset of functional blocks are disabled while still being powered by a supply, and power consumption is partially conserved by eliminating dynamic power consumption in any digital circuit.

In some embodiments, the subset of functional blocks includes the sensor readout circuit 108, the amplitude controller 114 and the phase controller 116. While these functional blocks are powered off or disabled during the active power saving durations, the amplitude and phase control signals that are generated during previous inactive durations are maintained within the drive generator 106 and the clock generator 112. Therefore, the generators 106 and 112 may still be controlled to properly drive the sensor module 102 and generate the system clock, respectively. In another word, a readout chain of the signal processor 104 may be powered off or disabled to partially conserve power consumption of the signal processor 104 without impacting normal operation of the sensor system 100.

The active and inactive power saving durations may adopt various time-multiplexed configurations. In some embodiments, the active and inactive power saving durations alternates periodically. In other embodiments, the active power saving durations are enabled as needed in order to better reserve power consumption.

Figure 2:
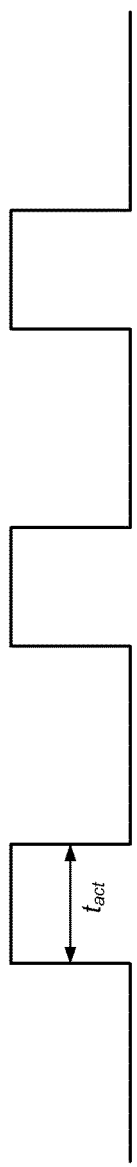
FIG. 2 illustrates an exemplary time diagram of alternating active and inactive power saving durations in a spot mode according to various embodiments in the present invention.

FIG. 2 illustrates an exemplary time diagram 200 of alternating active and inactive power saving durations in a spot mode according to various embodiments in the present invention. The active and inactive power saving durations alternate at a frequency $f_0$, and each active power saving duration lasts for a time period of $t_{act}$. Therefore, the duty cycle D of the active power saving durations is represented as:

$$D = t_{act} f_0 \quad (1)$$

During the power saving duty cycles, the signal processor 104 is partially functional so as to reduce power consumption.

Figure 3:
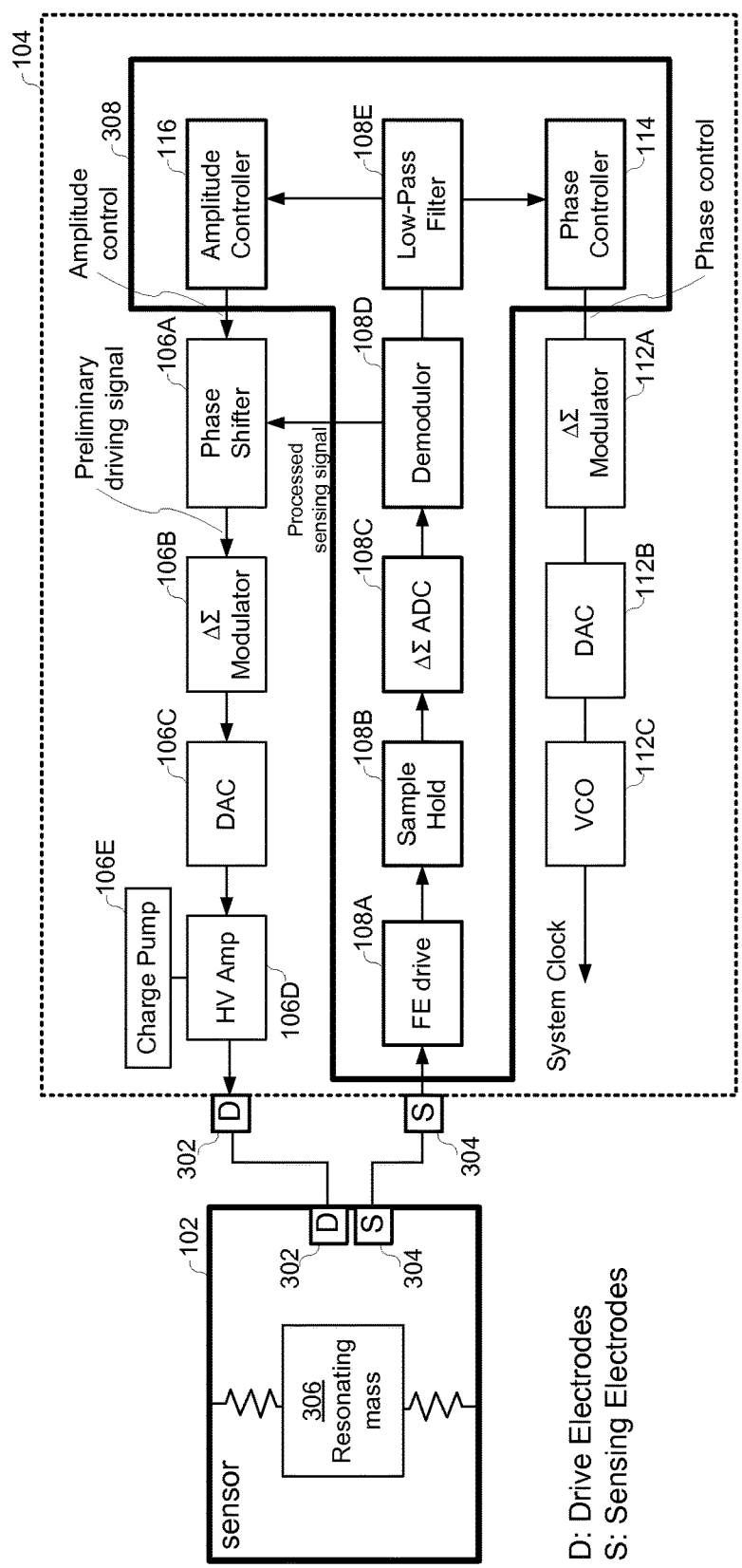
FIG. 3 illustrates an exemplary detailed block diagram of a sensor system operating at a spot mode according to various embodiments in the invention.

FIG. 3 illustrates an exemplary detailed block diagram 300 of a sensor system operating at a spot mode according to various embodiments in the invention. In the sensor system 300, the sensor module 102 and the signal processor 104 are coupled to each other via drive electrodes 302 and sensing electrodes 304. A driving signal is applied to the sensor module 102 via the drive electrodes 302 to electrostatically induce oscillation on a resonating mass 306, and in response, a sensing signal is coupled back to the signal processor 104 via the sensing electrodes 304. In certain embodiments, this sensor system 300 is implemented as a gyroscope for rotation sensing.

Certain resonating mass movement is sensed through the sensing signal associated with a capacitance variation or a current variation at the sensing electrodes 304, and the sensing signal is further processed by the sensor readout circuit 108 that hereby includes blocks 108A-108E. The sensing signal is a sinusoidal signal that adopts the resonant frequency $f_R$ of the resonating mass 306. In various embodiments, a front-end amplifier 108A is implemented as a charge amplifier or a trans-impedance amplifier that respectively converts a capacitive variation or a current value into a voltage signal. The sensed voltage signal is sampled and held in a sample-hold block 108B, and converted to a digital voltage signal in an analog-to-digital converter (ADC) 108C. The digital voltage signal is digitally demodulated by merging with another periodic waveform in the demodulator 108D. The merged voltage signal is further filtered by a low-pass filter 108E, and results in two control signals that may be fed to the amplitude controller 116 and the phase controller 114, respectively.

One of those skilled in the art knows that blocks 108A-108E is simply one exemplary implementation for the sensor readout circuit 108. In one embodiment, the sample-hold block 108B is optional and not necessarily essential. In some embodiments, the periodic waveform used in the demodulator 108D is another sinusoidal waveform that also adopts the resonant frequency $f_R$, and samples of the periodic waveform are stored in a look-up table. In certain embodiments, this periodic waveform may adopt a different configuration.

The driving signal is generated by the drive generator 106 to track both amplitude and phase of the sensing signal, and in this embodiment in FIG. 3, the generator 106 comprises blocks 106A-106E. A phase shifter 106A receives the amplitude control signal and another processed sensing signal provided by the amplitude controller 116 and the demodulator 108D, respectively. The processed sensing signal is a digital signal related to the sensing signal.

In one embodiment which the amplifier 108A is implemented as a charge amplifier, the phase shifter 106A generates a preliminary driving signal that has controlled amplitude and is 90 degrees shifted with respect to the sensing signal. However, in another embodiment which the amplifier 108A is implemented as a trans-impedance amplifier, the phase shifter 106A generates a preliminary driving signal that still has controlled amplitude but is in phase with respect to the sensing signal]. The phase shifter 106A ensures that the phase of the final actuation force may satisfy Barkhausen criterion of self-oscillation for a resonating system.

This preliminary driving signal is further converted to the driving signal as an analog voltage via consecutive steps of voltage modulation in a modulator 106B, signal conversion in a digital-to-analog converter (DAC) 106C, and amplification in a high-voltage (HV) amplifier 106D. To increase the voltage levels of the driving signal, the HV amplifier 106D may be separately powered by a charge pump 106E, such that the output range may be enhanced for the amplifier 106D.

One of those skilled in the art knows that blocks 106A-106E is simply one exemplary implementation for drive generator 106. In one embodiment, the HV amplifier 106D is not necessarily driven by a high voltage supply, such that the charge pump is optional and not necessarily essential.

The system clock is controlled in phase with the resonating movement of the resonating mass 306 by tracking the phase of the sensing signal. A ΔΣ modulator 112A and a DAC 112B convert the phase control signal to drive a voltage controlled oscillator (VCO) 112C. The characteristic frequency of the VCO, $f_{VCO}$, may be reduced to another frequency $f_{VCO}/N$ by a digital divider, and in steady state, the system clock adopts the frequency $f_{VCO}/n$ which matches the resonance frequency $f_R$.

The blocks 108A-108E in the sensor readout circuit 108, the amplitude controller 116 and the phase controller 114 form a readout chain 308. In one embodiment, the entire readout chain 308 is completely powered off during active power saving durations, and occasionally powered on during inactive power saving durations. The active and inactive power saving durations may alternate periodically or irregularly. In one embodiment, the readout chain 308 is disabled, while still being coupled to a power supply during the active power saving durations. In one embodiment, the sensor readout circuit 108 is constantly active during both active and inactive power saving durations, and however, the amplitude controller 114 and the phase controller 116 are powered off or disabled in a periodic or irregular manner.

Regardless of selection of the subset of functional blocks for power saving, the amplitude and phase control signals and the processed sensing signal are latched during the active power saving durations for controlling the 90-degree phase shifter 106A and the ΔΣ modulator 112A. These signals are refreshed during each corresponding inactive power saving duration. Even if the driving signal and the system clock may drift with respect to the resonating mass movement at the end of each active power saving duration, the drift may be corrected when the corresponding inactive power saving duration is subsequently restarted.

From another perspective, the inactive power saving durations have to be enabled timely in order to avoid the driving signal and the system clock from drifting too much and causing a large mismatch with the resonating mass movement. In the periodic time-multiplexed duration configuration, the duty cycle D and the alternating frequency $f_0$ have to be controlled to meet such requirement. In the irregular time-multiplexed configuration, the inactive power saving durations have to be activated, when the driving signal and the system drift to a certain level that they do not satisfactorily match the resonating mass movement any longer.

Figure 4:
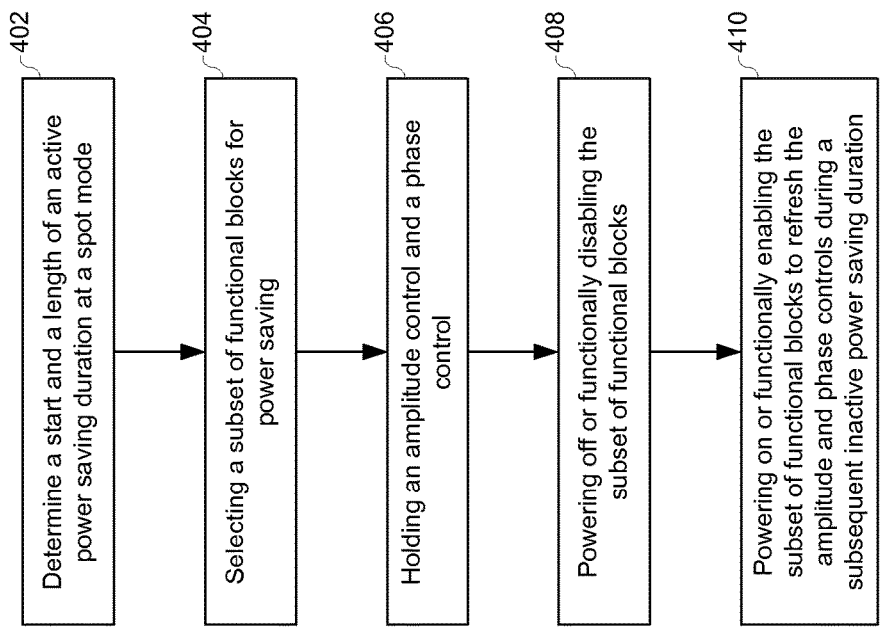
FIG. 4 illustrates an exemplary flow chart of a method for conserving power consumption of a sensor system according to various embodiments in the invention.

FIG. 4 illustrates an exemplary flow chart 400 of a method for conserving power consumption of a sensor system according to various embodiments in the invention. At step 402, a start time and a length of an active power saving duration are determined to save power at a spot mode. The duration length is determined to avoid a drift of a system clock and a driving signal with respect to the resonating mass movement. In one embodiment, active power saving durations may alternate with inactive power saving durations in a periodic manner. The corresponding frequency $f_0$ and duty cycle D are also adjusted to avoid unacceptable signal drifts. Accordingly, the start time and the length of the inactive power saving duration are determined based on the frequency and duty cycle.

At step 404, a subset of functional blocks are selected to be powered off or disabled. At step 406, an amplitude control signal and a phase control signal are held for continuous use by a drive generator and a clock generator. At step 408, the subset of functional blocks are powered off or functionally disabled. In some embodiments, certain signal paths may have to be decoupled from connection. For instance, connection at the amplitude and phase control signals may be decoupled, such that the signals may be held for continuous use in the drive generator and the clock generator during the active power saving duration.

At step 410, when the active power saving duration is terminated and the sensor system returns to normal operation, the subset of functional blocks are powered back on or functionally enabled again. In some embodiments, the decoupled connection is recoupled as well. The amplitude and phase controls are refreshed during a subsequent inactive power saving duration.

In general, this method 100 is used to conserve power consumption of a sensor system. Although the drive generator and the clock generator normally remain operational, the entire readout chain or other subset of the signal processor may be powered off or functionally disabled. Occasional sensing is sufficient to provide the amplitude and phase controls for generation of the driving signal and the system clock. By this means, power consumption may be reduced, allowing the sensor system to be applied in many power-sensitive applications.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

We claim:

1. A sensor signal processor that operates at a spot mode to conserve power consumption, comprising:
    a sensor readout circuit that generates a sensor output based on a sensing signal received from a sensor;
    an amplitude controller, coupled to the sensor readout circuit, the amplitude controller generating an amplitude control that controls a drive generator to drive a driving element in the sensor to oscillate with a controlled amplitude according to the sensing signal;
    a phase controller, coupled to the sensor readout circuit, the phase controller generating a phase control that is used to control the drive generator and the sensor readout circuit to operate in a synchronized manner; and
    wherein at the spot mode, a subset of functional blocks in the sensor signal processor are powered off during a plurality of active power saving durations and powered on during a respective inactive power saving duration subsequent to each of the plurality of active power saving durations, and the amplitude and phase controls are latched and refreshed during the plurality of active and inactive power saving durations, respectively.

2. The sensor signal processor according to claim 1, wherein the sensor is a micromachined gyroscope that comprises the driving element electrostatically driven to oscillate along a first axis, and rotation with respect to a second axis is sensed based on a Coriolis force induced on the micromachined gyroscope.

3. The sensor signal processor according to claim 1, further comprising:
    a clock generator, coupled to the phase controller, the clock generator generating a system clock that is used for synchronization; and
    a central processor, coupled to the clock generator, the central processor controlling the drive generator and the sensor readout circuit to operate in a synchronized manner.

4. The sensor signal processor according to claim 1, wherein the subset of functional blocks includes at least one of the sensor readout circuit, the phase controller and the amplitude controller.

5. The sensor signal processor according to claim 1, wherein the sensor readout circuit, the phase controller and the amplitude controller constitute a readout chain that is powered off during the active power saving durations.

6. The sensor signal processor according to claim 1, wherein the plurality of active power saving durations and the plurality of inactive power saving durations alternate periodically, and each of the active power saving durations has a duty cycle.

7. The sensor signal processor according to claim 1, wherein each of the plurality of active power saving durations is enabled as needed to conserve power consumption.

8. The sensor signal processor according to claim 1, wherein each of the plurality of inactive power saving durations is enabled timely to avoid a driving signal and a system clock from drifting too much and causing a large mismatch with resonating mass movement of the driving element, and wherein the driving signal and the system clock are generated in the sensor signal processor to drive the driving element and synchronize the operation, respectively.

9. The sensor signal processor according to claim 1, wherein the sensor readout circuit comprises a front-end amplifier, a sample-hold block, an analog-to-digital converter, a demodulator and a low-pass filter.

10. A method of conserving power consumption of a sensor system, comprising the steps of:
    determining a start and a length of an active power saving duration at a spot mode;
    selecting a subset of functional blocks in the sensor system during the active power saving duration;
    holding an amplitude control and a phase control, the amplitude control controlling generation of a driving signal that drives a driving element in a sensor to oscillate with a controlled amplitude based on a sensing signal received from the sensor, the phase control being used to control the sensor system to operate in a synchronized manner;
    powering off the subset of functional blocks for the length of the active power saving duration; and
    powering on the subset of functional blocks to refresh the amplitude and phase controls during a subsequent inactive power saving duration.

11. The method of conserving power consumption according to claim 10, wherein the sensor is a micromachined gyroscope that comprises the driving element electrostatically driven to oscillate along a first axis, and rotation with respect to a second axis is sensed based on a Coriolis force induced on the micromachined gyroscope.

12. The method of conserving power consumption according to claim 10, wherein the subset of functional blocks includes at least one of a sensor readout circuit, a phase controller and an amplitude controller that generate a sensor output, the amplitude controller, the amplitude control and the phase control based on the sensing signal received from the sensor, respectively.

13. The method of conserving power consumption according to claim 10, wherein the active power saving duration and the inactive power saving duration repeat periodically, and the active power saving duration has a duty cycle.

14. The method of conserving power consumption according to claim 10, wherein the active power saving duration is enabled as needed to conserve power consumption.

15. The method of conserving power consumption according to claim 10, wherein the inactive power saving duration is enabled timely to avoid the driving signal and a system clock from drifting too much and causing a large mismatch with resonating mass movement of the driving element, and wherein the driving signal and the system clock are generated in the sensor system to drive the driving element and synchronize the sensor system, respectively.

16. The method of conserving power consumption according to claim 10, wherein a sensing signal is received by a sensor readout circuit that generates a sensor output from the sensing signal, and wherein the sensor readout circuit comprises a front-end amplifier, a sample-hold block, an analog-to-digital converter, a demodulator and a low-pass filter.

17. A method of controlling a sensor system, comprising the steps of:
    determining a start and a length of an active power saving duration at a spot mode;
    selecting a subset of functional blocks in the sensor system during the active power saving duration;
    holding an amplitude control and a phase control, the amplitude control controlling generation of a driving signal that drives a sensor to oscillate with a controlled amplitude, the phase control being used to control the sensor system to operate in a synchronized manner;
    disabling the subset of functional blocks functionally for the length of the active power saving duration; and
    enabling the subset of functional blocks to refresh the amplitude and phase controls during a subsequent inactive power saving duration.

18. The method of controlling the sensor system according to claim 10, wherein the sensor is a micromachined gyroscope that comprises the driving element electrostatically driven to oscillate along a first axis, and rotation with respect to a second axis is sensed based on a Coriolis force induced on the micromachined gyroscope.

19. The method of controlling the sensor system according to claim 10, wherein the subset of functional blocks includes at least one of a sensor readout circuit, a phase controller and an amplitude controller that generate a sensor output, the amplitude controller, the amplitude control and the phase control based on the sensing signal received from the sensor, respectively.

20. The method of controlling the sensor system according to claim 10, wherein the inactive power saving duration is enabled timely to avoid the driving signal and a system clock from drifting too much and causing a large mismatch with resonating mass movement of the driving element, and wherein the driving signal and the system clock are generated in the sensor system to drive the driving element and synchronize the sensor system, respectively.

* * * * *